United States Patent
Michel et al.

(10) Patent No.: US 11,212,662 B2
(45) Date of Patent: Dec. 28, 2021

(54) OPERATING A MOBILE COMMUNICATIONS NETWORK HAVING A PLURALITY OF LOGIC SUBNETWORKS

(71) Applicant: DEUTSCHE TELEKOM AG, Bonn (DE)

(72) Inventors: Uwe Michel, Koenigswinter (DE); Joerg Rass, Cologne (DE); Walter Kerndlmaier, Koenigswinter (DE); Uwe Janssen, Alfter (DE)

(73) Assignee: DEUTSCHE TELEKOM AG, Bonn (DE)

( * ) Notice: Subject to any disclaimer, the term of this patent is extended or adjusted under 35 U.S.C. 154(b) by 454 days.

(21) Appl. No.: 16/313,912

(22) PCT Filed: Jun. 23, 2017

(86) PCT No.: PCT/EP2017/065489
§ 371 (c)(1),
(2) Date: Dec. 28, 2018

(87) PCT Pub. No.: WO2018/001878
PCT Pub. Date: Jan. 4, 2018

(65) Prior Publication Data
US 2021/0185509 A1   Jun. 17, 2021

(30) Foreign Application Priority Data
Jul. 1, 2016   (EP) ..................... 16177553

(51) Int. Cl.
*H04W 8/12* (2009.01)
*H04W 76/10* (2018.01)
(Continued)

(52) U.S. Cl.
CPC ............ *H04W 8/12* (2013.01); *H04W 48/18* (2013.01); *H04W 76/10* (2018.02); *H04W 92/02* (2013.01)

(58) Field of Classification Search
CPC ....... H04W 8/12; H04W 76/10; H04W 48/18; H04W 92/02
See application file for complete search history.

(56) References Cited

U.S. PATENT DOCUMENTS

2004/0067735 A1   4/2004 Lobley
2018/0270712 A1*  9/2018 Faccin ................. H04W 72/10
(Continued)

OTHER PUBLICATIONS

Anonymous, "3rd Generation Partnership Project; Technical Specification Group Services and System Aspects; Study on Architecture for Next Generation System (Release 14)," 3GPP Standard; 3GPP TR 23.799: 1-179 (Jun. 8, 2016). XP051123271.
(Continued)

*Primary Examiner* — Julio R Perez
(74) *Attorney, Agent, or Firm* — Leydig, Voit & Mayer, Ltd.

(57) ABSTRACT

A method for operating a mobile radio network includes: providing, by a network management entity, a first logic subnetwork of the mobile radio network to enable a mobile communication device with a subscription for the mobile radio network to communicate via the first logic subnetwork of the mobile radio network; and providing, by the network management entity, a second logic subnetwork of the mobile radio network to enable a roaming mobile communication device with a subscription for another mobile radio network to communicate via the second logic subnetwork of the mobile radio network.

14 Claims, 4 Drawing Sheets

(51) Int. Cl.
  *H04W 48/18* (2009.01)
  *H04W 92/02* (2009.01)

(56) References Cited

U.S. PATENT DOCUMENTS

2018/0324577 A1* 11/2018 Faccin .................. H04W 76/27
2019/0053147 A1*  2/2019 Qiao ....................... H04W 4/24

OTHER PUBLICATIONS

Deutsche Telekom: "SA WG2 Meeting #112; S2-153954; Key issue: 3GPP architecture impacts to support network slicing roaming", 20151116-20151120, Nov. 16, 2015 (Nov. 16, 2015), XP051041140.

ONF: "TR-526 Applying SDN Architecture to 5G Slicing", 3GPP Draft; Jun. 12, 2016 (Jun. 12, 2016), XP051110516.

3GPP TR 22.891 V 14.1.0 (Jun. 2016); "3$^{rd}$ Generation Partnership Project; Technical Specification Group Services and System Aspects; Feasibility Study on New Services and Markets Technology Enablers; Stage 1 (Release 14)", Jun. 24, 2016 (Jun. 24, 2016), pp. 1-95, XP051123367.

* cited by examiner

OPERATING A MOBILE COMMUNICATIONS NETWORK HAVING A PLURALITY OF LOGIC SUBNETWORKS

CROSS-REFERENCE TO PRIOR APPLICATIONS

This application is a U.S. National Phase application under 35 U.S.C. § 371 of International Application No. PCT/EP2017/065489, filed on Jun. 23, 2017, and claims benefit to European Patent Application No. EP 16177553.1, filed on Jul. 1, 2016. The International Application was published in German on Jan. 4, 2018 as WO 2018/001878 A1 under PCT Article 21(2).

FIELD

The invention relates to devices and methods for operating a communication network, in particular a 5G communication network.

BACKGROUND

The fifth generation of mobile technology (5G) relates to the requirements and technical challenges of future communication networks from approximately 2020 and beyond. This addresses a completely mobile and networked society characterized by an enormous growth of data traffic and mutual networking on a plurality of levels.

In 5G, new radio interfaces are needed to meet the requirements imposed on the use of higher frequencies, for example for new applications such as the Internet of Things (IoT), and special capabilities, for example a shorter propagation time, which go beyond that which can be provided by 4G communication networks. In this case, 5G is considered to be an end-to-end system which comprises all network aspects, specifically with a design which enables a high degree of convergence. 5G will make full use of the current access mechanisms and their possible further developments, including the current landline network access technologies and many other access technologies yet to be developed.

5G will operate in a highly heterogeneous environment, that is to say with a plurality of types of access technologies, multilayer networks, various types of communication devices and user interactions and the like. A wide variety of applications with diametrical requirements are intended to be optimally supported, for example failsafe robust communication, communication with low data rates or broadband communication in densely populated areas. In such an environment, there is a fundamental need for 5G in order to accomplish a seamless and consistent user experience over time and space. For the operator of a 5G communication network, it is necessary to optimally and dynamically adapt the resources used to the respective requirements in order to be able to simultaneously support the multiplicity of applications.

Therefore, in 5G, there is a need, on the one hand, to increase the communication performance, in particular to achieve a higher data throughput, a shorter delay, particularly high reliability, a far higher connection density and a larger mobility area, and, on the other hand, to also increase the flexibility during operation of the communication network and to provide tailor-made functions with the smallest possible use of means. This increased performance is expected together with the ability to control highly heterogeneous environments and the ability to safeguard the trust, identity and privacy of the users.

One of the most important functions which must be provided by mobile radio networks is roaming, that is to say to make it possible for a mobile radio network subscriber to automatically receive or make calls, to send and receive data or to have access to other mobile radio network services in a network other than its home network. Current roaming is characterized by extensive functional equality of the home network (also referred to as the home public land mobile network (HPLMN)) and of the visited network (also referred to as the visited public land mobile network (VPLMN)). The subscriber therefore finds largely the same environment in the VPLMN as in the home network. In support of this, although subscriber data are transmitted from the HPLMN to the VPLMN, they are used in the same manner as in the HPLMN (for example for the purpose of authorization).

5G mobile radio communication networks have the problem that, with the introduction of HPLMN-specific network slices, it can no longer be assumed that these slices are available per se in the VPLMN. The functions which are available in the respective network slice of the HPLMN must now be first of all exported to the VPLMN, which is very complicated.

SUMMARY

In an exemplary embodiment, the present invention provides a method for operating a mobile radio network. The method includes: providing, by a network management entity, a first logic subnetwork of the mobile radio network to enable a mobile communication device with a subscription for the mobile radio network to communicate via the first logic subnetwork of the mobile radio network; and providing, by the network management entity, a second logic subnetwork of the mobile radio network to enable a roaming mobile communication device with a subscription for another mobile radio network to communicate via the second logic subnetwork of the mobile radio network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide for increasing communication performance and flexibility, in particular in 5G mobile radio networks, with respect to the requirements mentioned above.

The methods and systems presented below can be implemented in different ways. The individual elements described can be implemented via hardware or software components, for example electronic components, which can be produced using different technologies and comprise, for example, semiconductor chips, application-specific integrated circuits (ASICs), microprocessors, digital signal processors, integrated electrical circuits, electro-optical circuits and/or passive components.

The devices, systems and methods presented below are suitable for transmitting information via a communication network. In this case, the term communication network denotes the technical infrastructure on which signals are transmitted. The communication network comprises substantially the switching network, in which the signals are transmitted and switched between the stationary devices and platforms of the mobile radio network or landline network, and the access network in which the signals are transmitted between a network access device and the communication terminal. In this case, the communication network can comprise both components of a mobile radio network and components of a landline network. In the mobile radio network, the access network is also referred to as an air interface and comprises, for example, a base station (NodeB, eNodeB, radio cell) with a mobile radio antenna in order to establish communication to a communication terminal, for example a mobile telephone or a smartphone or a mobile device with a mobile radio adapter. In the landline network, the access network comprises, for example, a DSLAM (digital subscriber line access multiplexer) in order to connect the communication terminals of a plurality of subscribers in a wired or cabled manner. Communication can be forwarded to further networks, for example of other network operators, for example foreign networks, via the switching network.

Figure 1:
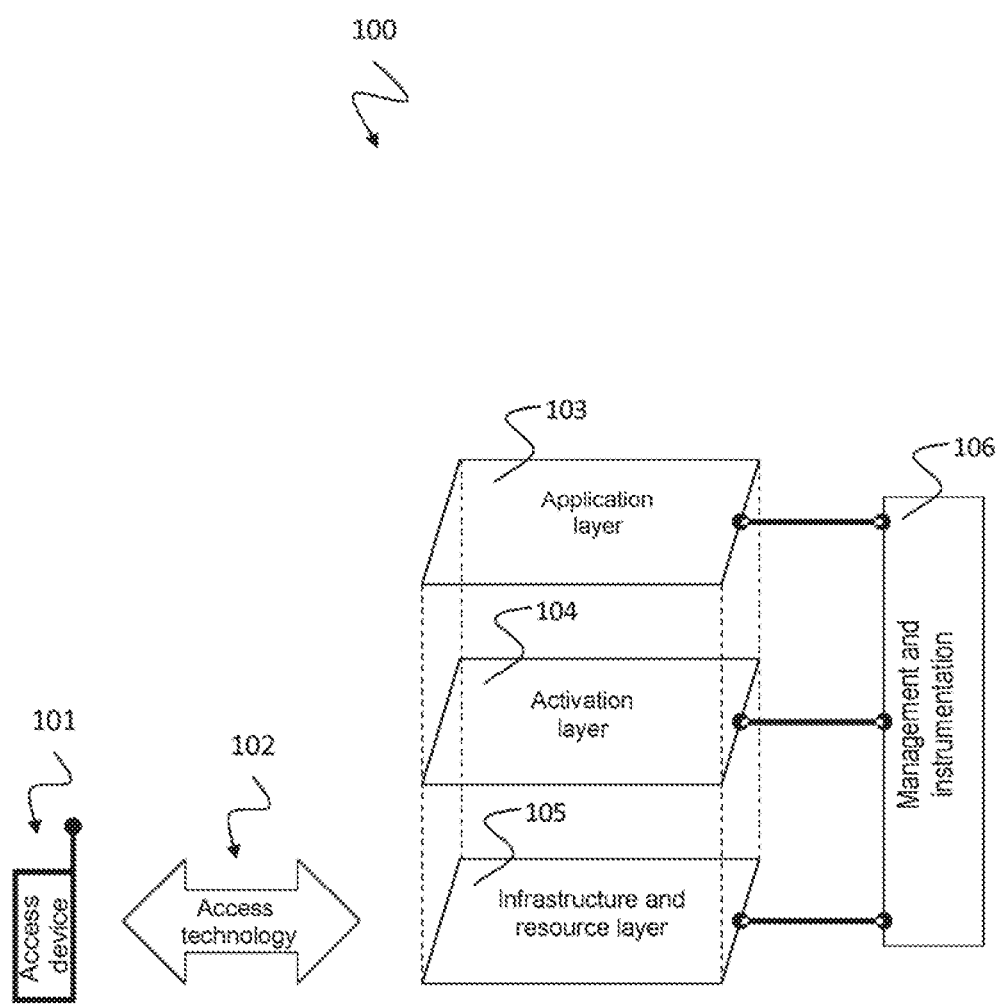
FIG. 1 shows a schematic illustration of the architecture of a 5G communication network.

The devices, systems and methods presented below enhance communication in communication networks, in particular in communication networks according to the 5G system architecture presented below. FIG. 1 shows a schematic illustration of such a 5G system architecture 100. The 5G system architecture 100 comprises an area with 5G communication terminals 101 which are connected, via different access technologies 102, to a multilayer communication structure comprising an infrastructure and resource layer 105, an activation layer 104 and an application layer 103 which are managed using a management and instrumentation level 106.

The infrastructure and resource layer 105 comprises the physical resources of a convergent network structure comprising landline network and mobile radio network components ("fixed-mobile convergence") with access nodes, cloud nodes (comprising processing and storage nodes), 5G devices, for example mobile telephones, portable devices, machine communication modules and the like. 5G devices may have various and configurable capabilities and may act as a relay or a hub, for example, or may operate as a computer/storage resource depending on the respective context. These resources are made available to the higher layers 104, 103 and to the management and instrumentation level 106 via corresponding APIs (application programming interfaces). The process of monitoring the performance and the configurations may be an inherent part of such APIs.

The activation layer 104 comprises a library of functions which are required inside a converged network in the form of modules of a modular architecture. These comprise functions which are implemented via software modules, which can be retrieved from a storage place of the desired location, and a set of configuration parameters for particular parts of the network, for example radio access. These functions and capabilities can be called on request by the management and instrumentation level 106, specifically by using the APIs provided for this purpose. Numerous variants may exist for particular functions, for example various implementations of the same functionality which have different performances or characteristics. The various degrees of performance and the capabilities offered can be used to distinguish the network functionalities to a considerably greater extent than is possible in current networks, for example to offer a nomadic mobility, a vehicle mobility or an air traffic mobility as a mobility function on the basis of the specific needs.

The application layer 103 comprises specific applications and services of the network operator, of companies, of vertical operators or of third parties using the 5G network. The interface to the management and instrumentation level 106 allows, for example, particular, that is to say dedicated, network slices to be established for an application or allows an application to be allocated to an existing network slice.

The management and instrumentation level 106 is the contact point in order to convert the required use cases into actual network functions and slices. It defines the network slices for a given application scenario, concatenates the modular network functions relevant thereto, assigns the relevant performance configurations and maps everything to the resources of the infrastructure and resource layer 105. The management and instrumentation level 106 also manages both the scaling of the capacity of these functions and their geographical distribution. In particular use cases, it may also have capabilities which allow third parties to generate and manage their own network slices by using the APIs. On account of the numerous tasks of the management and instrumentation level 106, this is generally not a monolithic block of functionality but rather a collection of modular functions which integrate advances which are achieved in various network domains, for example NFV ("network function virtualization"), SDN ("software-defined networking") or SON ("self-organizing networks"). The management and instrumentation level 106 uses data-aided intelligence to optimize all aspects of service arrangement and service provision.

The devices, systems and methods presented here improve communication in communication networks, in particular in 5G communication networks having a plurality of network slices, as described below.

Figure 2:
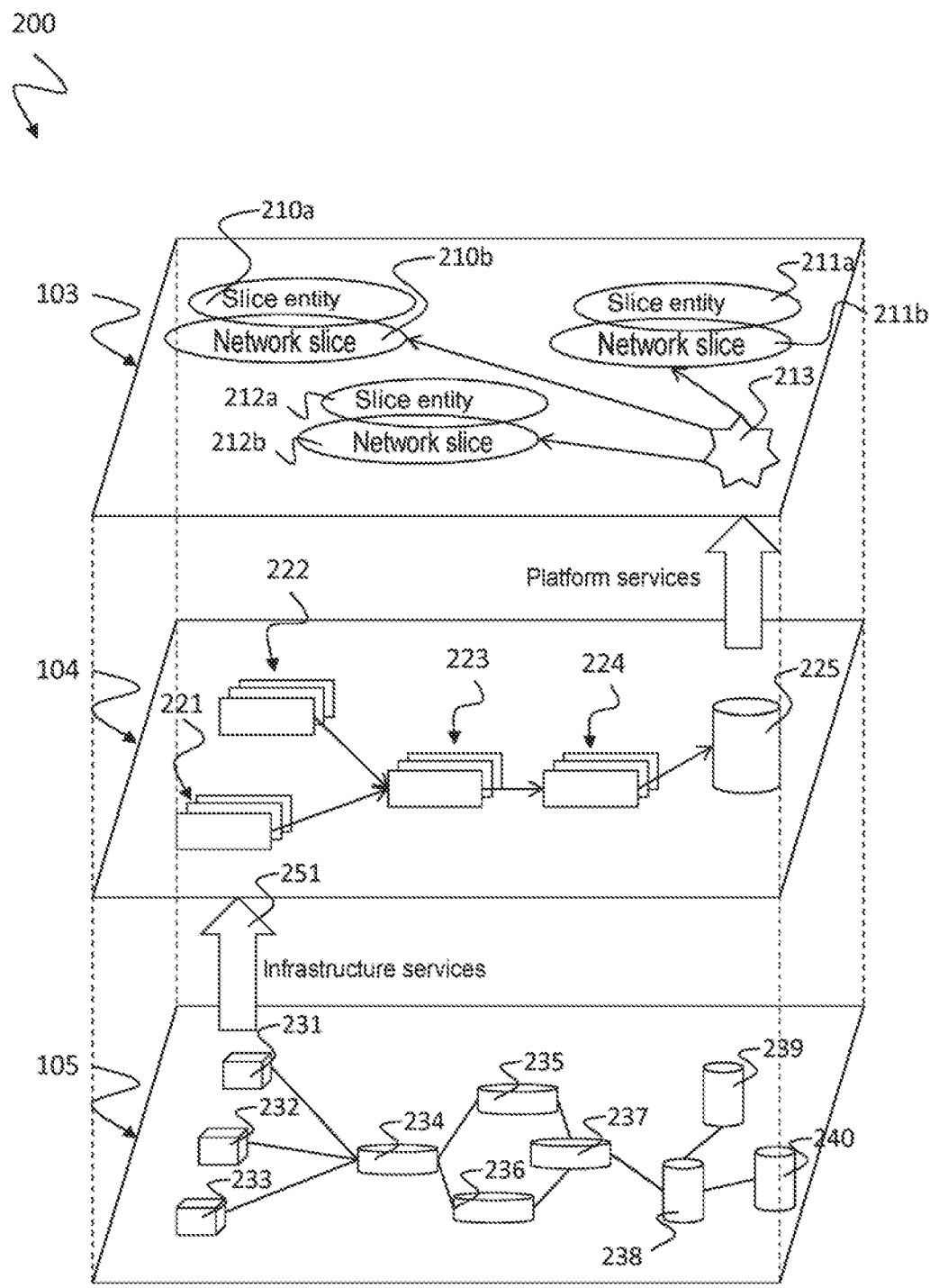
FIG. 2 shows a schematic illustration of a 5G communication network having a plurality of network slices.

FIG. 2 shows a schematic illustration of a 5G communication network 200 having a plurality of network slices. The 5G communication network 200 comprises an infrastructure and resource layer 105, an activation layer 104 and an application layer 103.

The infrastructure and resource layer 105 comprises the entire physical infrastructure assigned to a network operator, that is to say sites, cables, network nodes and the like. This layer 105 forms the basis for all network slices. It is constructed as generically as possible in order to minimize the number of specialized physical units. The infrastructure and resource layer 105 conceals any type of user-specific implementation from the upper layers, with the result that the remaining systems can be used in the best possible manner for different slices. Components of the infrastructure and resource layer 105 are based on hardware and software or firmware which is required for the respective operation and is made available in this case as an infrastructure and resource layer 105 to the layers above as resource objects. For example, objects of the infrastructure and resource layer 105 comprise virtual machines, virtual links or connections and virtual networks, for example virtual access nodes 231, 232, 233, virtual network nodes 234, 235, 236, 237 and virtual computer nodes 238, 239, 240. As the term "virtual" already states, the infrastructure and resource layer 105 provides the objects in the form of an "infrastructure as a service" 251, that is to say in an abstracting, virtualized form, to the next higher layer 104.

The activation layer 104 is arranged above the infrastructure and resource layer 105. It uses the objects of the infrastructure and resource layer 105 and adds additional functionality thereto in the form of (for example non-physical) software objects in order to make it possible to generate any type of network slices and thus to provide a platform as a service to the next higher layer 103.

Software objects can exist in any granularity and can comprise a tiny or a very large fragment of a network slice. In order to allow network slices to be generated on a suitable abstraction level, various abstracted objects 221 can be combined with other abstracted objects and with virtual network functions 222 in the activation layer 104 in order to form combined objects 223 which can be converted into aggregated objects 224 and are made available to the next higher level in an object library 225. The complexity can therefore be hidden behind the network slices. For example, a user or customer can generate a mobile broadband slice and in the process can define only KPIs (Key Performance Indicators) without having to specify specific features such as individual local antenna coverage, backhaul connections and specific degrees of parameterization. In order to support an open environment and to allow network functions to be added or deleted on request, an important capability of the activation layer 104 is that it supports the dynamic rearrangement of functions and connectivities in a network slice, for example by using SFC ("Service Function Chaining") or modifying software, with the result that the functionality of a slice can be completely predefined and can comprise both approximately static software modules and software modules which can be dynamically added.

In this case, a network slice can be considered to be a software-defined entity which is based on a set of objects which define a complete network. The activation layer 104 plays a key role in this concept since it can comprise all software objects which are needed to provide the network slice and the corresponding skills for handling the objects. The activation layer 104 can be considered to be a type of network operating system complemented by a network generation environment. An important task of the activation layer 104 is to define the corresponding abstraction levels. Network operators therefore have sufficient freedom to design their network slices, while the platform operator can still maintain and optimize the physical nodes. For example, the performance of the daily tasks, such as the addition or replacement of NodeBs etc., is supported without the intervention of the network customers. The definition of suitable objects which model a complete telecommunication network is one of the important tasks of the activation layer 104 when developing a network slice environment.

A network slice, also referred to as a 5G slice, supports the communication services of a particular connection type with a particular way of handling the C (control) and U (user data) layer, also referred to as the "Control Plane" and the "User Plane". A 5G slice is composed of a collection of different 5G network functions and specific radio access technology (RAT) settings which are combined with one another for the specific use case. Therefore, a 5G slice can span all domains of the network, for example software modules which run on cloud nodes, specific configurations of the transport network which support a flexible location of the functions, a particular radio configuration or even a particular access technology as well as a configuration of the 5G devices. Not all slices contain the same functions; some functions which nowadays appear to be essential for a mobile network may not even occur in some slices. The intention of a 5G slice is to provide only the functions which are required for the specific use case and to avoid all other unnecessary functionalities. The flexibility behind the slice concept is the key both for expanding existing use cases and for generating new use cases. Third-party devices can therefore be granted permission to control particular aspects of slices via suitable APIs in order to thus be able to provide tailor-made services.

The application layer 103 comprises all generated network slices 210b, 211b, 212b and offers these as a "network as a service" to various network users, for example various customers. The concept allows the reuse of defined network slices 210b, 211b, 212b for various users, for example as a new network slice entity 210a, 211a, 212a. For example, a network slice 210b, 211b, 212b which is assigned to an automotive application, for example, can also be used for various other industrial applications. The slice entities 210a, 211a, 212a which have been generated by a first user can be independent of the slice entities which have been generated by a second user, for example, even though the entire network slice functionality may be the same.

Against this background, the invention according to a first aspect relates to a method for operating a mobile radio network. In this case, the method comprises providing a first logic subnetwork, in particular a first network slice, of the mobile radio network in order to make it possible for a mobile communication device with a subscription for the mobile radio network to communicate via the first logic subnetwork of the mobile radio network, and providing a second logic subnetwork, in particular a second network slice, of the mobile radio network in order to make it possible for a roaming mobile communication device with a subscription for another mobile radio network to communicate via the second logic subnetwork of the mobile radio network. From the point of view of the roaming mobile communication device, the mobile radio network is a VPLMN and the other mobile radio network is an HPLMN. One advantage of the invention is, in particular, that user-specific, non-standardized functions of the HPLMN can also be executed in the VPLMN through the provision of the second network slice. This is advantageous, in particular, for latency-critical applications in which rerouting of the traffic to the HPLMN is excluded for reasons of time.

In an embodiment of the method according to the first aspect of the invention, the step of providing the second subnetwork of the mobile radio network is carried out in response to a step of registering the roaming mobile communication device in the mobile radio network, in particular in the first logic subnetwork of the mobile radio network.

In an embodiment of the method according to the first aspect of the invention, the method also comprises the step of operating the first logic subnetwork and the second logic subnetwork in a parallel manner. Such an embodiment allows rapid changeover between the first logic subnetwork and the second logic subnetwork.

In an embodiment of the method according to the first aspect of the invention, a base station can be part of the first logic subnetwork and part of the second logic subnetwork, wherein the base station is configured, as part of the first logic subnetwork, to communicate with a mobile communication device on the basis of a first radio access technology and, as part of the second logic subnetwork, to communicate with the roaming mobile communication device on the basis of a second radio access technology.

In an embodiment of the method according to the first aspect of the invention, the second logic subnetwork of the mobile radio network simulates at least some functions of the other mobile radio network.

In an embodiment of the method according to the first aspect of the invention, the method also comprises the step of providing the mobile radio network with instantiation software from the other mobile radio network via an interface, wherein the instantiation software is configured to provide the second logic subnetwork in the mobile radio network.

In an embodiment of the method according to the first aspect of the invention, the step of providing the instantiation software is carried out in response to a step of registering the roaming mobile communication device in the mobile radio network, in particular in the first logic subnetwork of the mobile radio network, or in the form of a one-off set-up process or in the form of a repeating update process.

In an embodiment of the method according to the first aspect of the invention, the process of providing the second logic subnetwork of the mobile radio network comprises selecting the second logic subnetwork of the mobile radio network from a multiplicity of second logic subnetworks of the mobile radio network.

In an embodiment of the method according to the first aspect of the invention, the selection of the second logic subnetwork of the mobile radio network from a multiplicity of second logic subnetworks of the mobile radio network is based on a subscriber profile linked to the roaming mobile communication device.

In an embodiment of the method according to the first aspect of the invention, the method comprises the further step of providing the mobile radio network with the subscriber profile linked to the roaming mobile communication device from the other mobile radio network.

In an embodiment of the method according to the first aspect of the invention, the process of providing the subscriber profile linked to the roaming mobile communication device is carried out in response to a step of registering the roaming mobile communication device in the mobile radio network, in particular in the first logic subnetwork of the mobile radio network, and a step of transmitting a unique subscriber identification, in particular an IMSI, from the mobile radio network to the other mobile radio network.

According to a second aspect, the invention relates to a network management entity, in particular an SDN orchestrator, for operating logic subnetworks of a mobile radio network, wherein the network management entity is configured to provide a first logic subnetwork of the mobile radio network in order to make it possible for a mobile communication device with a subscription for the mobile radio network to communicate via the first logic subnetwork of the mobile radio network and to provide a second logic subnetwork of the mobile radio network in order to make it possible for a roaming mobile communication device with a subscription for another mobile radio network to communicate via the second logic subnetwork of the mobile radio network.

In an embodiment of the network management entity according to the second aspect of the invention, the network management entity is also configured to provide the second subnetwork of the mobile radio network in response to registration of the roaming mobile communication device in the mobile radio network, in particular in the first logic subnetwork of the mobile radio network.

In an embodiment of the network management entity according to the second aspect of the invention, the second logic subnetwork of the mobile radio network simulates at least some functions of the other mobile radio network.

Further embodiments of the network management entity according to the second aspect of the invention emerge from the preceding embodiments of the method according to the first aspect of the invention.

In the following detailed description, reference is made to the accompanying drawings which form a part thereof and which show, as an illustration, exemplary embodiments in which the invention can be carried out. It will be appreciated that other embodiments can also be used and structural or logical changes can be made without departing from the concept of the present invention. The following detailed description should therefore not be understood in a restrictive sense. It will also be appreciated that the features of the various exemplary embodiments described herein can be combined with one another unless specifically stated otherwise.

The aspects and embodiments are described with reference to the drawings, wherein identical reference signs generally relate to identical elements. Numerous specific details are stated in the following description for the purposes of explanation in order to provide an in-depth understanding of one or more aspects of the invention. However, it may be apparent to a person skilled in the art that one or more aspects or embodiments can be implemented with a lower degree of the specific details. In other cases, known structures and elements are illustrated in a schematic form in order to facilitate the description of one or more aspects or embodiments. It will be appreciated that other embodiments can be used and structural or logical changes can be made without departing from the concept of the present invention.

Devices and methods are described. It will be appreciated that basic properties of the devices also apply to the methods and vice versa. Therefore, a double description of such features is possibly dispensed with for the sake of brevity.

Figure 3:
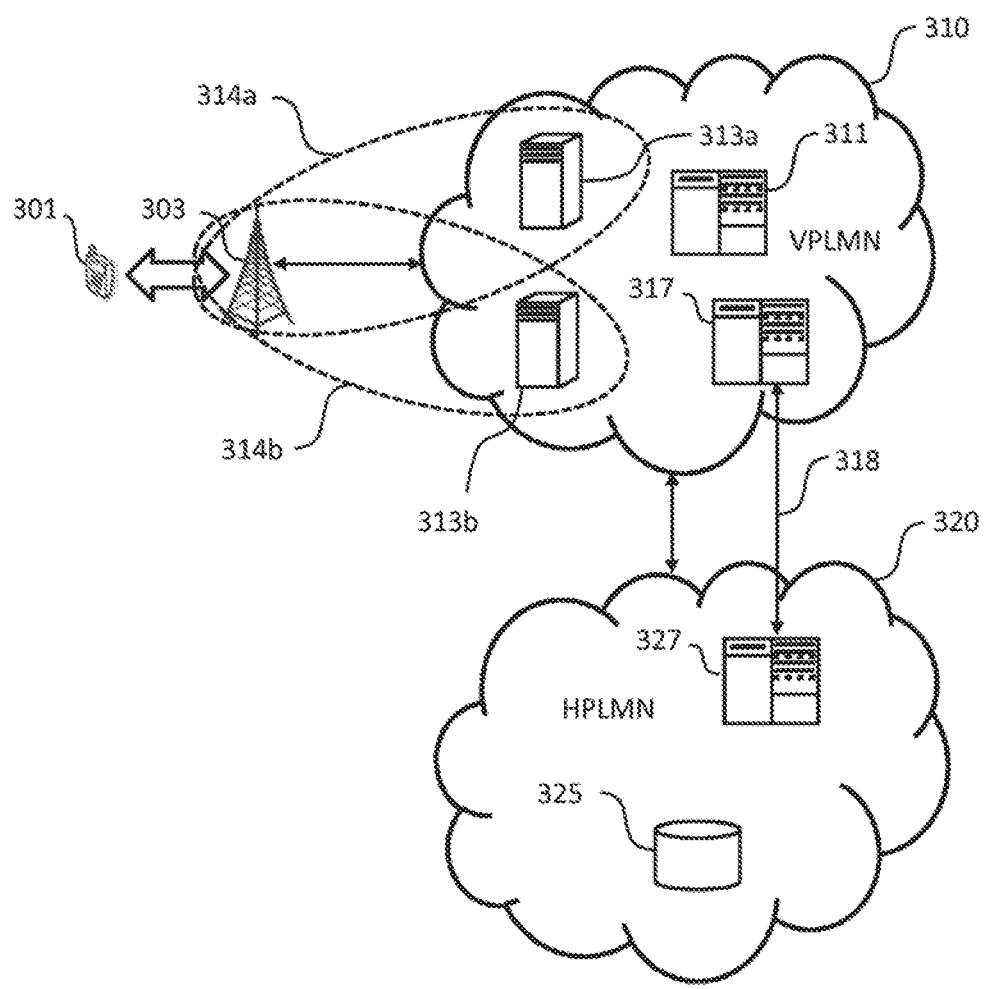
FIG. 3 shows a schematic illustration of a 5G communication network having an HPLMN and a VPLMN with a plurality of network slices according to an embodiment of the invention.

FIG. 3 shows a schematic illustration of a 5G communication system having a first mobile radio network 310 and a second mobile radio network 320, wherein the first mobile radio network 310 has a plurality of logic subnetworks in the form of network slices 314a, 314b. The first mobile radio network 310 and the second mobile radio network 320 may be mobile radio networks of different operators in different countries, for example.

The term "network slice" or "network slicing" relates to a concept for operating a plurality of logic networks as virtually independent, that is to say logically decoupled, units on a common physical network infrastructure. In this sense, a network slice represents an independent virtual end-to-end network which, from the point of view of the user, behaves in the same manner as a physical network, including business logic and network management capabilities. For further details on network slices in the sense of the present invention, reference is made to "NGMN 5G White Paper" and, in particular, to section 5.4 thereof which can be retrieved from the website of the "NGMN Alliance" (www.ngmn.org), and to which reference is fully made hereby.

In the embodiment illustrated in FIG. 3, the mobile communication device 301 has a subscription for the second mobile radio network 320, but does not have a subscription for the first mobile radio network 310. From the point of view of the mobile communication device 301, the first mobile radio network 310 is a VPLMN (visited public land mobile network) and the second mobile radio network 320 is an HPLMN (home public land mobile network) or home network 320. From the point of view of the first mobile radio network 310, the mobile communication device 301 is a roaming mobile communication device 301.

According to an embodiment, when registering the roaming mobile communication device 301, for example a mobile telephone 301, in the VPLMN 310, the registration process is first of all processed by a first default network slice 314*a* which is instantiated on at least one server 313*a* of the VPLMN 310, for example. Another possibility is for the roaming mobile communication device 301 to immediately find an environment which corresponds to the home network 320 of the roaming mobile communication device 301 or simulates at least some functions of this home network 320. This may be effected, for instance, by virtue of instantiation software loaded into the VPLMN 310 generating a new radio interface (emitted by the antenna of a base station 303) which can be immediately used by the roaming mobile communication device 301. Since a network slice can have a complete end-to-end character, the roaming mobile communication device 301 can in this respect already implicitly make the necessary selection of the network slice during registration in the VPLMN 310. In this case, the instantiation software to be loaded into the VPLMN 310 can be executed on an individual server 313*a* of the VPLMN 310 or in a manner distributed among a plurality of servers. In this case, an SDN controller 311 is used to provide the networking required in a respective network slice 314*a*, 314*b*, in particular to forward data packets to the network slices 314*a*, 314*b* on the basis of switches.

The processing of the registration of the roaming mobile communication device 301 is transferred to the further network slice 314*b* which can be instantiated, for example, on at least one further server 313*b* of the VPLMN 310 if the roaming mobile communication device 301 reveals which network slice 314*a*, 314*b* is intended to be used. Alternatively, a transfer to the further network slice 314*b* can be prompted by data transmitted from the HPLMN 320 to the VPLMN 310 for this purpose, for example in the form of a subscriber profile which has been made available to the VPLMN 310 by a home user directory 325 of the HPLMN 320 in response to the registration of the roaming mobile communication device 301 and the transmission of a unique subscriber identification, in particular an IMSI, to the HPLMN 320. In such an embodiment, the subscriber profile can be used to identify or select one or more possible network slices which can be used, with respect to the roaming mobile communication device 301, as networks which are of the same type as or are at least partially functionally identical to the home network 320.

According to an embodiment, the network slice 314*b* provides at least part of the functionality which is found by the roaming mobile communication device 301 when registering in its home network 320. In other words: the network slice 314*b* is preferably configured to be as functionally identical as possible to the network slice with which the roaming mobile communication device 301 in FIG. 3 interacts when registering in its home network 320.

As already described above, the network slice 314*b* can be based on instantiation software which is or has been made available to the VPLMN 310 by the HPLMN 320. This software can simulate a complete slice or only a part of a slice of the HPLMN 320, while the rest of the slice (particular functionalities) is provided by a complementary slice of the VPLMN 310.

In order to provide the instantiation software, a corresponding management interface 318 can be provided between the VPLMN 310 and the HPLMN 320, specifically, in particular, between an SDN orchestrator 317 of the VPLMN 310 and an SDN orchestrator 327 of the HPLMN 320. In this case, the management interface 318 is configured such that the instantiation software transferred to the SDN orchestrator 317 via the management interface 318 can be executed on the VPLMN 310, for example on the server 313*a*, the server 313*b* and/or the SDN orchestrator 317 itself, in order to instantiate a corresponding slice on the VPLMN 310. The SDN orchestrator 317 of the VPLMN 310 can be configured, as a network management entity, to instantiate and manage the network slices 314*a*, 314*b*. In embodiments of the invention, the SDN orchestrator 317 of the VPLMN 310 can be configured, after the roaming mobile communication device 301 has been registered in the default network slice 314*a*, to assign the roaming mobile communication device 301 to the network slice 314*b* which at least partially simulates the functionality of the HPLMN 320.

According to embodiments of the invention, the instantiation software can be provided dynamically "on demand" via the management interface 318 or as a one-off set-up process or a repeating update process.

In embodiments of the invention, the base station 303 communicating with the roaming mobile communication device 301 can also be part of the slice 314*a* and/or the slice 314*b*. This makes it possible to implement a special radio interface implemented in the HPLMN 320 between the roaming mobile communication device 301 and the base station 303, that is to say a software-defined radio interface.

Figure 4:
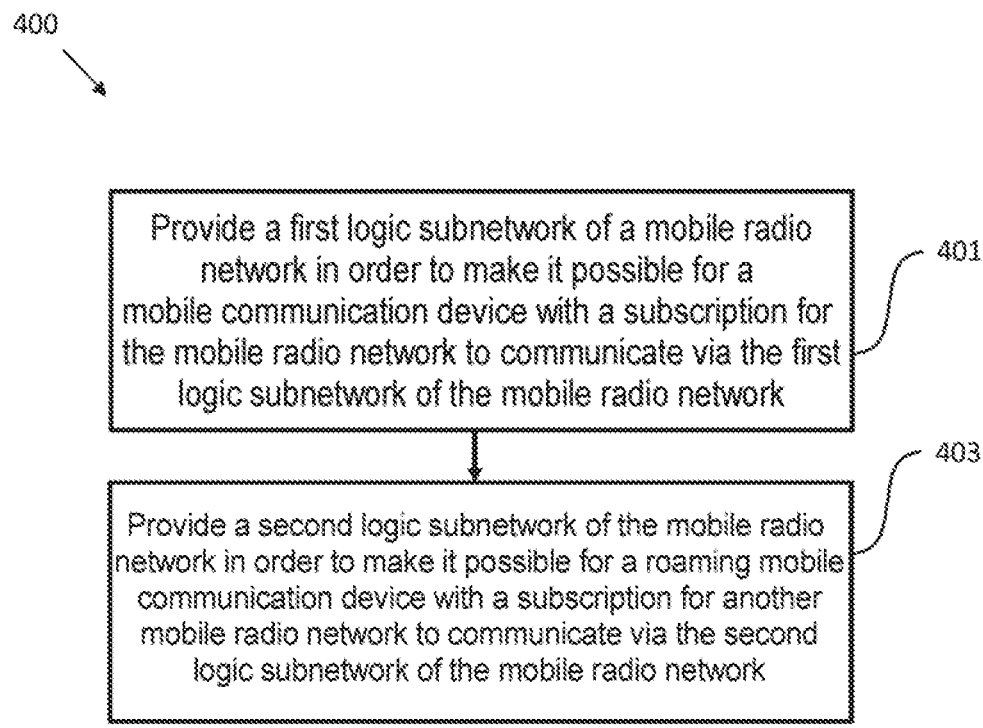
FIG. 4 shows a schematic illustration of a method according to an embodiment which is implemented in the 5G communication network from FIG. 3.

FIG. 4 shows a schematic illustration of a method 400 for operating the mobile radio network 310 from FIG. 3. The method 400 comprises a step 401 of providing the first logic subnetwork 314*a* of the mobile radio network 310 in order to make it possible for a mobile communication device with a subscription for the mobile radio network 310 to communicate via the first logic subnetwork 314*a* of the mobile radio network 310 and a step 403 of providing a second logic subnetwork 314*b* of the mobile radio network 310 in order to make it possible for the roaming mobile communication device 301 with a subscription for the mobile radio network 320 to communicate via the second logic subnetwork 314*b* of the mobile radio network 310.

An exemplary advantage of embodiments of the invention is that user-specific, non-standardized functions of the HPLMN 320 can also be executed in the VPLMN 310. This is advantageous, in particular, for latency-critical applications in which rerouting of the traffic to the HPLMN 320 is excluded for reasons of time.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a mobile radio network, wherein the method comprises:
providing, by a network management entity, a first network slice of the mobile radio network to enable a mobile communication device with a subscription for the mobile radio network to communicate via the first network slice of the mobile radio network; and
providing, by the network management entity, a second network slice of the mobile radio network to enable a roaming mobile communication device with a subscription for another mobile radio network to communicate via the second network slice of the mobile radio network, wherein providing the second network slice of the mobile radio network comprises selecting the second network slice of the mobile radio network from a plurality of second network slices of the mobile radio network.

2. The method according to claim 1, wherein providing the second network slice of the mobile radio network is carried out in response to registering the roaming mobile communication device in the first network slice of the mobile radio network.

3. The method according to claim 1, further comprising: operating the first network slice and the second network slice in a parallel manner.

4. The method according to claim 1, wherein a base station is part of the first network slice and part of the second network slice, and wherein the base station is configured, as part of the first network slice, to communicate with a mobile communication device on the basis of a first radio access technology and, as part of the second network slice, to communicate with the roaming mobile communication device on the basis of a second radio access technology.

5. The method according to claim 1, wherein the second network slice of the mobile radio network simulates at least some functions of the other mobile radio network.

6. The method according to claim 1, further comprising: providing the mobile radio network with instantiation software from the other mobile radio network via an interface, wherein the instantiation software is configured to provide the second network slice in the mobile radio network.

7. The method according to claim 6, wherein providing the instantiation software is carried out in response to registering the roaming mobile communication device in the first network slice of the mobile radio network, or in the form of a one-off set-up process or in the form of a repeating update process.

8. The method according to claim 1, wherein the selection of the second network slice of the mobile radio network from the plurality of second network slices of the mobile radio network is based on a subscriber profile linked to the roaming mobile communication device.

9. The method according to claim 8, further comprising: providing the mobile radio network with the subscriber profile linked to the roaming mobile communication device from the other mobile radio network.

10. The method according to claim 9, wherein providing the subscriber profile linked to the roaming mobile communication device is carried out in response to registering the roaming mobile communication device in the first network slice of the mobile radio network, and transmitting a unique subscriber identification from the mobile radio network to the other mobile radio network.

11. A network management entity for operating network slices of a mobile radio network comprising a processor and a non-transitory computer-readable medium having processor-executable instructions stored thereon, wherein the processor-executable instructions, when executed by the processor, provide for execution of the following steps:
providing a first network slice of the mobile radio network to enable a mobile communication device with a subscription for the mobile radio network to communicate via the first network slice of the mobile radio network; and
providing a second network slice of the mobile radio network to enable a roaming mobile communication device with a subscription for another mobile radio network to communicate via the second network slice of the mobile radio network, wherein providing the second network slice of the mobile radio network comprises selecting the second network slice of the mobile radio network from a plurality of second network slices of the mobile radio network.

12. The network management entity according to claim 11, wherein providing the second network slice of the mobile radio network is in response to registration of the roaming mobile communication device in the first network slice of the mobile radio network.

13. The network management entity according to claim 11, wherein the second network slice of the mobile radio network is configured to simulate at least some functions of the other mobile radio network.

14. The network management entity according to claim 11, wherein the network management entity is configured as a software-defined networking orchestrator.

* * * * *